US009023926B2

(12) United States Patent
Wiedemeier et al.

(10) Patent No.: US 9,023,926 B2
(45) Date of Patent: May 5, 2015

(54) METHOD FOR PRODUCING RUBBER MIXTURES

(75) Inventors: Melanie Wiedemeier, Dormagen (DE); Hermann-Josef Weidenhaupt, Pulheim (DE); Heinz Unterberg, Dormagen (DE); Ulrich Feldhues, Bergisch-Gladbach (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 14/114,062

(22) PCT Filed: Apr. 27, 2012

(86) PCT No.: PCT/EP2012/057859
§ 371 (c)(1),
(2), (4) Date: Feb. 6, 2014

(87) PCT Pub. No.: WO2012/146759
PCT Pub. Date: Nov. 1, 2012

(65) Prior Publication Data
US 2014/0171565 A1 Jun. 19, 2014

(30) Foreign Application Priority Data
Apr. 29, 2011 (EP) .................................... 11164320

(51) Int. Cl.
B32B 7/12 (2006.01)
C08F 8/34 (2006.01)
C08L 9/06 (2006.01)
B60C 1/00 (2006.01)
C08K 3/06 (2006.01)
C08K 3/36 (2006.01)
C08K 5/37 (2006.01)
C08K 5/39 (2006.01)
C08L 21/00 (2006.01)
C08K 5/3415 (2006.01)
C08K 5/38 (2006.01)
C08K 5/41 (2006.01)
C08K 5/548 (2006.01)

(52) U.S. Cl.
CPC ... C08L 9/06 (2013.01); B60C 1/00 (2013.01); C08K 3/06 (2013.01); C08K 3/36 (2013.01); C08K 5/37 (2013.01); C08K 5/39 (2013.01); C08L 21/00 (2013.01); B60C 1/0016 (2013.01); C08K 5/3415 (2013.01); C08K 5/38 (2013.01); C08K 5/41 (2013.01); C08K 5/548 (2013.01)

(58) Field of Classification Search
CPC .......... B60C 1/00; B60C 1/0016; C08L 9/06; C08L 21/00; C08K 3/36; C08K 5/37; C08K 5/39; C08K 5/3415; C08K 5/38; C08K 5/41; C08K 5/548
USPC .............. 524/186; 525/331.8, 332.6
See application file for complete search history.

(56) References Cited

U.S. PATENT DOCUMENTS

| 3,773,732 | A |   | 11/1973 | Dillenschneider |
|-----------|---|---|---------|-----------------|
| 3,938,574 | A |   | 2/1976  | Burmester et al. |
| 4,076,550 | A |   | 2/1978  | Thurn et al. |
| 4,709,065 | A |   | 11/1987 | Yoshioka et al. |
| 4,820,751 | A |   | 4/1989  | Takeshita et al. |
| 5,227,425 | A |   | 7/1993  | Rauline |
| 5,496,883 | A |   | 3/1996  | Hamada |
| 5,663,226 | A |   | 9/1997  | Scholl et al. |
| 5,717,038 | A |   | 2/1998  | Horpel et al. |
| 5,736,611 | A |   | 4/1998  | Blok et al. |
| 6,046,280 | A | * | 4/2000  | Datta et al. ................. 525/331.8 |
| 6,268,421 | B1 |  | 7/2001  | Dittrich et al. |
| 6,359,045 | B1 |  | 3/2002  | Jeske et al. |
| 2001/0031822 | A1 | | 10/2001 | Scholl et al. |
| 2003/0015271 | A1 | | 1/2003  | Meza et al. |
| 2003/0088023 | A1 | * | 5/2003 | Motofusa et al. ............... 525/63 |
| 2005/0043466 | A1 | | 2/2005  | Kishimoto et al. |
| 2009/0036579 | A1 | | 2/2009  | Belin et al. |

(Continued)

FOREIGN PATENT DOCUMENTS

EP 0099074 A2 1/1984
EP 0489313 A1 6/1992

(Continued)

OTHER PUBLICATIONS

Ullmann's Encyclopedia of Industrial Chemistry, vol. A23, Rubber 3. Synthetic, VCH D-69451, Weinheim, 1993, pp. 239-364, 366-417.
Ullmann's Encyclopedia of Industrial Chemistry, VCH, D-69451, Weinheim, 1993 "Silica", pp. 635-645.
Ullmann's Encyclopedia of Industrial Chemistry, VCH, D-69451, Weinheim, 1993, vol. A5, "Carbon Black", pp. 95-158.
International Search Report from co-pending Application PCT/EP2012/057859 dated May 25, 2012, 3 pages.

Primary Examiner — William Cheung

(57) ABSTRACT

The present invention relates to a process for producing rubber mixtures in a mixing process with, for example, a plurality of mixing stages, where these can optionally be divided into a plurality of sub-steps, comprising the mixing of the following components:
one or more rubbers,
one or more hydroxylated oxidic fillers,
one or more sulphur-containing organosilicon and/or one or more hydroxypolysulphidic compounds,
one or more anti-reversion agents selected from 1,6-bis(N, N-dibenzyl-thiocarbamoyldithio)hexane (CAS No.: 151900-44-6), 1,3-bis((3-methyl-2,5-dioxopyrrol-1-yl)methyl)benzene (CAS No.: 119462-56-5) and hexamethylene 1,6-bis(thiosulphate), disodium salt, dihydrate (CAS No.: 5719-73-3), individually and mixtures thereof, where these are incorporated into the mixture in the first mixing stage,
one or more vulcanization additives,
one or more rubber additives.

12 Claims, No Drawings

(56) References Cited

U.S. PATENT DOCUMENTS

2010/0113663 A1 5/2010 Kawasaki et al.
2010/0197829 A1 8/2010 Obrecht
2011/0082234 A1 4/2011 Hattori et al.

FOREIGN PATENT DOCUMENTS

| JP | 56104906 A2 | 8/1981 |
|----|-------------|--------|
| JP | 2011052098 A2 | 3/2011 |

* cited by examiner

METHOD FOR PRODUCING RUBBER MIXTURES

This application is the U.S. national stage of International Application No. PCT/EP2012/057859 filed Apr. 27, 2012, which claims the benefit under 35 USC 119 of European Application No. EP 11164320.1 filed Apr. 29, 2011. All of which are incorporated by reference herein in their entirety.

The present invention relates to a process for producing rubber mixtures and to rubber mixtures produced thereby.

The use of silica-containing rubber mixtures is known for producing tyre treads with a good combination of properties comprising rolling resistance, wet grip and abrasion, this being the combination demanded for car tyre treads. To achieve the desired combination of properties it is important to achieve good dispersion of the silica and to couple the silica to the rubber matrix during the vulcanization process. To this end, sulphur-containing organic silanes are used during production of the mixture (e.g.: DE-A-24 47 614; U.S. Pat. No. 4,709,065; EP-A-0 501 227; EP-A-99 074; DE-A-3 813 678, and also EP-A-447 066). Certain polysulphide silanes are moreover described as reinforcing additives for silica-containing rubber vulcanizates in DE-A 2 255 577 and DE 4 435 311, EP-A1 0 0670 347, and also U.S. Pat. No. 4,709,065.

The use of anti-reversion agents in compounded rubber materials is known and is described by way of example in the following patents: EP 1134253, EP 0 489 313, EP 1000968, and also DE-A 2 255 577. The anti-reversion agents are usually added together with the sulphur and the accelerators to the mixture in the final step.

The person skilled in the art is aware that mixtures with high filler content reach very high temperatures in the range from 140° C. to 170° C. during the mixing procedure. These high temperatures prevent any addition of the crosslinking chemicals, such as accelerators, peroxides and vulcanization resins, because these are temperature-sensitive. For these mixtures, a second mixing stage is carried out subsequently on a roll mill or in an internal mixer. In this second stage, temperatures above 120° C. are avoided. The said two mixing steps are termed initial mixing and final mixing (Röthemeyer, Sommer, 2006, Kautschuktechnologie [Rubber technology], pp. 389 ff and Rapra Review Report, 1996, Rubber Mixing).

It is preferable to use a two-stage mixing process for high filler contents, small plasticizer quantities or high-activated carbon black. After the initial mixture has been formed, it is subjected to a number of hours of intermediate storage and cooling and then, in the final-mixing stage, introduced together with the crosslinking chemicals into the internal mixer (Röthemeyer, Sommer, 2006, Kautschuktechnologie [Rubber technology], pp. 389 ff and Rapra Review Report, 1996, Rubber Mixing).

Some highly filled rubber mixtures can be subjected to what is known as a further remill step in which the viscosity of the mixture after initial mixing is improved in a separate mixing operation. The entire production of the mixture in this instance takes place in a three-stage process (Röthemeyer, Sommer, 2006, Kautschuktechnologie [Rubber technology], pp. 389 ff and Rapra Review Report, 1996, Rubber Mixing), and here again the anti-reversion agents are added in the final step.

DE102007020451A1 assumes that scorch (scorching) of the mixture must be inhibited in the first and second mixing step in the thermomechanical treatment of the rubber mixture. For this reason, the thermomechanical treatment is carried out without additions which would lead to scorch the mixture. The intention is therefore that the addition of vulcanization accelerators and optionally also of sulphur donors, of capped bismercaptans, and also of sulphur and optionally of zinc oxide and stearic acid take place at the end of the second mixing step after cooling of the mixture to temperatures <120° C.

It is therefore an object of the invention to provide a process which can produce rubber mixtures and which improves the physical and mechanical properties of unvulcanized and vulcanized rubber mixtures, for example rolling resistance and abrasion, and which exhibits a reduction in vulcanization time, while the rubber mixture does not reveal any substantial change of network density.

It is known that 1,6-bis(N,N-dibenzylthiocarbamoyldithio)hexane (CAS No.: 151900-44-6) is a anti-reversion agent which incorporates carbasulphane crosslinks during the crosslinking process and thus produces a reversion-resistant network, and in the process releases a sulphur-carbon network, the expression used being hybrid crosslinking. In the light of this it can also be termed a sulphur donor, and it is usually added only in the final mixing step, together with sulphur and vulcanization accelerators.

The prevailing assumption is therefore that, in order that the further processing of the rubber mixture is not inhibited by premature crosslinking, anti-reversion agents, where these are known as sulphur donors, are not to be incorporated by mixing in the 1st mixing stage at high temperatures.

The invention therefore provides a process for producing rubber mixtures in a mixing process with a plurality of mixing stages, where these can optionally be divided into a plurality of sub-steps, comprising the mixing of the following components:

one or more rubbers,
  one or more hydroxylated oxidic fillers,
  one or more sulphur-containing organosilicon and/or one or more hydroxypolysulphidic compounds,
  one or more anti-reversion agents selected from 1,6-bis(N,N-dibenzyl-thiocarbamoyldithio)hexane (CAS No.: 151900-44-6), 1,3-bis((3-methyl-2,5-dioxopyrrol-1-yl) methyl)benzene (CAS No.: 119462-56-5) and hexamethylene 1,6-bis(thiosulphate), disodium salt, dihydrate (CAS No.: 5719-73-3), individually and mixtures thereof, where these are incorporated into the mixture in the first mixing stage,
  one or more vulcanization additives,
  one or more rubber additives.

Surprisingly, it has been found that anti-reversion agents can be used in combination with silica and with silanes in the first mixing stage >80° C. without substantially increasing the Mooney ML 1+4 viscosity of the mixture, and the rubber mixture can therefore be further processed.

It is preferable that the anti-reversion agents are added in the first mixing stage in at least two sub-steps, preferably in at least two portions.

In the prior art, when 1,6-bis(N,N-dibenzylthiocarbamoyldithio)hexane (CAS No.: 151900-44-6) (Vulcuren®) is used in the final mixing stage in silica-containing rubber mixtures, the sulphur content must be reduced in order to prevent over-vulcanization, and this requires appropriate adaptation of the formulation.

Surprisingly, in the use according to the invention of the anti-reversion agents in the first mixing stage, there is no need to reduce the sulphur content. The vulcanization time can be markedly reduced, thus permitting considerable cost reduction and profitability increase in the production process, e.g. for a tyre as the final product.

Rubbers used for the process according to the invention preferably include those based on dienes, particular examples being rubbers which contain double bonds and which comprise practically no gel content and which are termed R rubbers in accordance with DIN/ISO 1629. The said rubbers have double bonds in the main chain. Examples of rubbers preferably used are those based on NR: natural rubber
SBR: styrene/butadiene rubber
BR: polybutadiene rubber
IR: polyisoprene
SIBR: styrene/isoprene rubber
NBR: nitrile rubber
IIR: butyl rubber (isobutene/isoprene rubber)
HNBR: hydrogenated nitrile rubber
SNBR: styrene/butadiene/acrylonitrile rubber
CR: polychloroprene
XSBR: carboxylated styrene/butadiene rubber
XNBR: carboxylated butadiene/acrylonitrile rubber
ENR: epoxidized natural rubber
ESBR: epoxidized styrene/butadiene rubber and mixtures thereof.

According to the invention, rubber components containing double bonds also include those which are M-rubbers in accordance with DIN/ISO 1629 and which have double bonds in side chains alongside the saturated main chain. Among these is, for example, EPDM.

Preferred rubber components according to the invention are: NR, BR, SBR, IIR and EPDM.

Particular preference is given to NR and BR, and also styrene/diolefins, and also mixtures of the said rubbers.

Styrene/diolefin (in particular butadiene) rubbers are to be understood as solution-SBR rubbers, for which the abbreviation is: SSBR, as well as emulsion-SBR rubbers, for which the abbreviation is: ESBR. SSBR means rubbery polymers which are produced in a solution process based on vinylaromatics and on conjugated dienes (H. L. Hsieh, R. P. Quirk, Marcel Dekker Inc. New York-Basle 1996; 1. Franta Elastomers and Rubber Compounding Materials; Elsevier 1989, pp. 73-74, 92-94; Houben-Weyl, Methoden der Organischen Chemie [Methods of organic chemistry], Thieme Verlag, Stuttgart, 1987, Volume E 20, pp. 114 to 134; Ullmann's Encyclopedia of Industrial Chemistry, Vol. A 23, Rubber 3. Synthetic, VCH Verlagsgesellschaft mbH, D-69451 Weinheim, 1993, pp. 239-364, and also (FR 2 295 972)). Suitable vinylaromatic monomers are styrene, o-, m- and p-methylstyrene, technical methylstyrene mixtures, p-tert-butylstyrene, α-methylstyrene, p-methoxystyrene, vinylnaphthalene, divinylbenzene, trivinylbenzene and divinylnaphthalene. Styrene is preferred. The content of copolymerized vinylaromatic is preferably from 5 to 50% by weight, more preferably from 10 to 40% by weight. Suitable diolefins are 1,3-butadiene, isoprene, 1,3-pentadiene, 2,3-dimethylbutadiene, 1-phenyl-1,3-butadiene and 1,3-hexadiene. 1,3-Butadiene and isoprene are preferred. The content of copolymerized dienes is from 50 to 95% by weight, preferably from 60 to 90% by weight. The content of vinyl groups in the copolymerized diene is from 10 to 90% by weight, the content of 1,4-trans double bonds is from 20 to 80% and the content of 1,4-cis double bonds is complementary to the entirety of vinyl groups and of 1,4-trans double bonds. The vinyl content of the SSBR is preferably >20%.

The polymerized monomers and the various diene configurations usually have random distribution within the polymer. The definition of SSBR is also intended to cover rubbers having block-type structure, these being termed integral rubber (K.-H. Nordsiek, K.-H. Kiepert, GAK rubber Gummi Kunststoffe 33 (1980), No. 4, 251-255).

The term SSBR is intended to mean not only linear but also branched or end-group-modified rubbers. Mention may be made here by way of example of: FR 2 053 786 and JP-A-56-104 906. Branching agents used preferably comprise silicon tetrachloride or tin tetrachloride.

The rubber component for the rubber mixtures according to the invention is produced in particular via anionic solution polymerization, i.e. by means of a catalyst based on alkali metal or on alkaline earth metal in an organic solvent.

The vinylaromatic/diolefin rubbers polymerized in solution advantageously have Mooney values of from 20 to 150 Mooney units, preferably from 30 to 100 Mooney units. In particular the high-molecular-weight types of ESBR with Mooney values >80 MU can comprise amounts of from 30 to 100 parts by weight of oils, based on 100 parts by weight types of rubber. The oil-free SSBR rubbers have glass transition temperatures of from −80° to +20° C., determined by differential thermal analysis (DSC).

The term ESBR means rubbery polymers which are produced in an emulsion process based on vinylaromatics, on conjugated dienes and optionally on other monomers (Ullmann's Encyclopedia of Industrial Chemistry, Vol A 23, Rubber 3. Synthetic, VCH Verlagsgesellschaft mbH, D-69451 Weinheim, 1993, pp. 247-251). Vinylaromatics are styrene, p-methylstyrene and alpha-methylstyrene. Dienes are in particular butadiene and isoprene. Other monomers are in particular acrylonitrile. The contents of vinylaromatics are from 10 to 60% by weight. The glass transition temperature is from −50 to +20° C. (determined by means of DSC), and the Mooney values are from 20 to 150 Mooney units. In particular the high-molecular-weight types of ESBR with Mooney values >80 MU can comprise amounts of from 30 to 100 parts by weight of oils, based on 100 parts by weight of rubber. The oil-free SSBR rubbers have glass transition temperatures of from −80° to +20° C., determined by differential thermal analysis (DSC).

Polybutadiene (BR) comprises in particular two different classes of polybutadiene type. The first class has at least 90% 1,4-cis content and is produced with the aid of Ziegler/Natta catalysts based on transition metals. It is preferable to use catalyst systems based on Ti, Ni, Co and Nd (Houben-Weyl, Methoden der Organischen Chemie [Methods of organic chemistry], Thieme Verlag, Stuttgart, 1987, Volume E 20, pp. 114 to 134; Ullmann's Encyclopedia of Industrial Chemistry, Vol A 23, Rubber 3. Synthetic, VCH Verlagsgesellschaft mbH, D-69451 Weinheim, 1993, pp. 239-364). The glass transition temperature of this polybutadiene is preferably ≤−90° C. (determined by means of DSC).

The second class of polybutadiene type is produced using Li catalysts and has vinyl contents of from 10% to 80%. The glass transition temperatures of these polybutadiene rubbers are in the range from −90 to +20° C. (determined by means of DSC).

According to the invention, it is preferable that the rubber component is selected from the group consisting of: styrene/butadiene rubbers and polybutadiene, where these rubbers can also be rubbers extended with mineral oils.

The ratio between the other components and the rubber components is usually stated in terms of the relative quantity phr (parts per hundred parts rubber). The amounts usually used for every 100 parts by weight of the rubber components are from 5 to 100 parts by weight of the hydroxylated oxidic filler (corresponding to from 5 to 100 phr), from 0.1 phr to 10 phr, preferably from 0.2 phr to 5 phr, of the sulphur-containing organosilicon compound, preferably bis(triethoxysilylpropyl)tetrasulphide or bis(triethoxysilylpropyl) disulphide, from 0.1 to 10 phr of anti-reversion agent, preferably from 0.2 to 5 phr, and also from 0.1 to 20 phr of vulcanization additives (for example oils, ozone waxes, antioxidants).

It is preferable that the mixtures according to the invention moreover comprise amounts of from 1 to 100 phr of carbon black.

Hydroxylated Oxidic Filler:

Hydroxylated oxidic filler used is preferably a silicon-containing oxidic hydroxylated filler, for example in particular silica. Silicas of this type, in particular hydrophilic silicas, in particular bear hydroxy groups at the surface.

"Silica" (Ullmann's Encyclopedia of Industrial Chemistry, VCH Verlagsgesellschaft mbH, D-69451 Weinheirn, 1993, "Silica", pp. 635-645) is in particular used in the form of fumed silica (ibid. pp. 635-642) or in the form of precipitated silica (ibid. 642-645), and according to the invention preference is given to the precipitated silica here. The precipitated silicas have a specific surface area of from 5 to 1000 $m^2/g$, determined in accordance with BET, preferably a specific area of from 20 to 400 $m^2/g$. They are obtained by treatment of waterglass with inorganic acids, and it is preferable to use sulphuric acid here. The silicas can optionally also take the form of mixed oxides with other metal oxides, such as Al, Mg, Ca, Ba, Zn, Zr, or Ti oxides.

According to the invention it is preferable to use silicas with specific surface areas of from 5 to 1000 $m^2/g$, more preferably from 20 to 400 $m^2/g$, determined in each case in accordance with BET.

The hydroxylated oxidic filler used according to the invention is preferably used in amounts of from 5 to 150 phr, with preference from 30 to 100 phr, based on 100 phr (parts per 100 parts rubber), and the hydroxylated oxidic filler here makes up at least 30%, preferably at least 50%, of the filler content, based on the total amount of the tillers used.

Sulphur-Containing Organosilicon Compounds:

The sulphur-containing organosilicon compounds preferably contain one or more alkoxysilyl groups, preferably one or more trialkoxysilyl groups.

Preferred sulphur-containing organosilicon compounds are bis(triethoxysilylpropyl polysulphanes); products of this type are by way of example available commercially as silane Si 75 and as silane Si 69 (CAS No.: 40372-72-3) from Degussa.

The total amounts used of the sulphur-containing organosilicon compounds are advantageously from 0.2 phr to 12 phr.

According to the invention it is essential that the sulphur-containing organosilicon compounds are added in at least two separate portions. Separate means that between the addition of the portions there is a time interval. It is clear to the person skilled in the art what this means in practice, without any definition of a lower limit for the time interval. The time interval is preferably at least about 1 minute, but it depends greatly on the rubber mixture and mixing apparatus. It is preferable that the addition takes place during at least one mixing stage at elevated temperatures which are in particular above 60° C.

Anti-Reversion Agents:

Anti-reversion agent used according to the invention is preferably 1,6-bis(N,N-dibenzyl-thiocarbamoyldithio)hexane (CAS No.: 151900-44-6).

It can preferably be used individually or in combination with other anti-reversion agents, in particular with 1,3-bis((3-methyl-2,5-dioxopyrrol-1-yl)methyl)benzene (CAS No.: 119462-56-5) or hexamethylene 1,6-bis(thiosulphate), disodium salt, dihydrate (CAS No.: 5719-73-3). It is preferable that these are used in the first mixing stage in combination with silica and alkoxysilanes, and it is particularly preferable that they are added in two separate portions to the rubber mixture.

It is preferable to use at least 0.5 to 10% by weight of anti-reversion agents, preferably from 0.5 to % by weight and particularly preferably from 0.5 to 3% by weight.

Vulcanization Additives:

Vulcanizing agents used according to the invention are in particular sulphur or sulphur donors, for example dithiomorpholine (DTDM) or 2-(4-morpholinodithio)benzothiazole (MBSS). Sulphur and sulphur donors are used in amounts of, for example, from 0.1 to 15 parts by weight, preferably from 0.1 to 10 parts by weight, based on the entire amount of rubber.

Rubber Additives:

Among the rubber additives used according to the invention are in particular vulcanization accelerators. Examples of suitable vulcanization accelerators are mercaptobenzothiazoles, -sulphenamides, guanidines, thiuram disulphides, dithiocarbamates, thioureas, thiocarbonates, and also dithiophosphates, etc. (Ullmann's Encyclopedia of Industrial Chemistry, VCH Verlagsgesellschaft mbH, D-69451 Weinheim, 1993, Vol. A 23 "Chemicals and Additives", pp. 366-417).

The vulcanization accelerators are advantageously not added in a mixing step at elevated temperatures which is carried out in order to activate the hydroxylated oxidic filler, such as the silica by means of the sulphur-containing organosilicon compounds, since they would lead to premature scorch of the mixture. They are therefore preferably incorporated after addition of the sulphur-containing organosilicon compounds at temperatures which are preferably below 100° C.

The vulcanization accelerators are preferably used in amounts of from 0.1 to 15 parts by weight, preferably from 0.1 to 10 parts by weight, based on the total amount of rubber.

The rubber mixtures produced according to the invention preferably comprise at least one vulcanization accelerator. The mixtures frequently comprise a plurality of accelerators optionally in combination with activators.

The rubber mixtures produced according to the invention preferably comprise other rubber additives known per se.

Among these are also in particular other fillers, such as in particular carbon black, which is preferably used in the rubber mixtures produced according to the invention. Carbon black, see "carbon" or "carbon black" (Ullmann's Encyclopedia of Industrial Chemistry, VCH Verlagsgesellschaft mbH, D-69451 Weinheim, 1993, Vol. A 5 "Carbon Black", pp. 95-158) produced according to the invention are preferably produced by the gas black, furnace black, lamp black and thermal black process and in accordance with the new ASTM nomenclature (ASTM D1765 and D2516) are termed N 110, N 115, N 121, N 125, N 212, N 220, N 231, N 234, N 242, N 293, N 299, S 315, N 326, N 330, N 332, N 339, N 343, N 347, N 351, N 375, N 472, N 539, N 550, N 582, N 630, N 642, N 650, N 660, N 683, N 754, N 762, N 765, N 772, N 774, N 787, N 907, N 908, N 990, N 991 S 3 etc. The carbon blacks used according to the invention preferably have BET surface areas of from 5 to 200 $m^2/g$.

According to the invention, carbon black is preferably used in amounts of from 0 to 120 phr, preferably from 1 to 100 phr, more preferably from 5 to 80 phr.

According to the invention, the total amount of hydroxylated oxidic filler and carbon black is preferably from 20 to 160 phr, with preference from 25 to 140 phr.

Other fillers which are optionally used are:
synthetic silicates, such as aluminium silicate, alkaline earth metal silicate, such as magnesium silicate or calcium silicate with BET surface areas of from 20 to 400 m²/g and with primary particle diameters of from 5 to 400 nm, naturally occurring silicates, such as kaolin and other naturally occurring silicates, metal oxides, such zinc oxide, calcium oxide, magnesium oxide, aluminium oxide, metal carbonates, such as calcium carbonate, magnesium carbonate, zinc carbonate, metal sulphates, such as calcium sulphate, barium sulphate, metal hydroxides, such as aluminium hydroxide and magnesium hydroxide, glass fibres and glass fibre products (mats, strands or glass microbeads), thermoplastics (polyamide, polyester, aramid, polycarbonate, syndiotactic 1,2-polybutadiene and trans-1,4-polybutadiene, and also cellulose and starch.

Other rubber additives comprise antioxidants, light stabilizers, antiozonants, processing aids, plasticizers, mineral oil, tackifiers, blowing agents, dyes, pigments, waxes, resins, extenders, organic acids, vulcanization retardants, vulcanization activators, such as zinc oxide, stearic acid, and also zinc stearate, metal oxides, and also other filler activators, such as triethanolamine, trimethylolpropane, polyethylene glycol, hexanetriol, aliphatic trialkoxysilanes or others known in the rubber industry (Ullmann's Encyclopedia of Industrial Chemistry, VCH Verlagsgesellschaft mbH, D-69451 Weinheim, 1993, Vol. A 23 "Chemicals and Additives", pp. 366-417).

The rubber additives are used in conventional amounts which depend inter alia on the intended purpose. Conventional amounts for individual rubber additives with the exception of the other fillers, such as in particular carbon black and, respectively, mineral oil are by way of example from 0.1 to 50 phr.

Vulcanization of the rubber mixtures produced is preferably carried out at temperatures of from 100 to 250° C., preferably from 130 to 180° C., optionally under a pressure of from 1 to 100 bar.

The rubber mixtures produced are suitable for producing various tyre components, in particular for tyre treads, subtreads, carcasses, side walls, reinforced side walls for run-flat tyres, apex mixtures etc., and also for producing technical rubber items, such as damping elements, roll coverings, conveyor-belt coverings, drive belts, spinning cops, gaskets, golf-ball cores, shoe soles, etc. The mixtures are particularly suitable for producing tyre treads, subtreads, carcasses and apex mixtures. Tyres and tyre parts here also include by way of example treads of summer tyres, of winter tyres and of all-season tyres, and also treads of car tyres and of truck tyres.

The invention is explained in more detail by using the examples below, but there is no intention that these restrict the invention.

The rubber mixtures are produced by way of example in the following mixing steps:

1st Mixing Stage:
charging of SBR and BR in an internal mixer and mixing for about 30 seconds
adding two thirds of silica, two thirds of silane, and also two thirds of anti-reversion agent, mixing for about 60 seconds
adding one third of silica, one third of silane, one third of anti-reversion agent, and also oil, mixing for about 60 seconds
adding carbon black, oil, antioxidants, zinc oxide, and also antiozonant waxes, mixing for about 60 seconds This mixing procedure can be carried out at temperatures of from 100 to 170° C., preferably in the region of 150° C.

2nd Mixing Stage:
After finishing the first mixing stage, the mix is received by a downstream roll mill and formed into a sheet, a strip or pellets, and stored at room temperature for 24 hours.
Processing temperatures here are below 60° C.

3rd Mixing Stage:
The third mixing stage comprises a further remill step at from 140 to 170° C., preferably at 150° C., for example in a kneader/internal mixer.

4th Mixing Stage:
Adding vulcanization/rubber additives, for example accelerator(s) and sulphur, preferably on a roll at low temperatures (<80° C.).

Suitable assemblies for producing the mixture are known per se and include by way of example rolls, internal mixers, or else mixing extruders.

It is also possible, of course, to use a proportion of the anti-reversion agent(s) in the subsequent mixing stages; it is preferable that the anti-reversion agent(s) is/are entirely added in the first mixing stage.

Substances Used:
1. Buna® VSL 5025 from LANXESS Deutschland GmbH
2. Buna® CB 24 from LANXESS Deutschland GmbH
3. Vulkasil® S from LANXESS Deutschland GmbH
4. Tudalen 1849-1
5. Rotsiegel zinc white from Grillo Zinkoxid GmbH
6. Edenor® C 18 98-100 from Cognis Deutschland GmbH
7. 2,2,4-Trimethyl-1,2-dihydroquinoline, polymerized (Vulkanox® HS/LG from LANXESS Deutschland GmbH)
8. N-1,3-Dimethylbutyl-N'-phenyl-p-phenylenediamine (Vulkanox® 4020/LG from LANXESS Deutschland GmbH)
9. Antilux® 654 from RheinChemie GmbH
10. Bis(triethoxysilylpropyl)polysulphide (Si® 69 from Degussa Hüls AG)
11. Corax N 339 from Degussa Hüls AG
12. Soluble sulphur (90/95° Chancel® ground sulphur from Solvay Barium Strontium
13. N-Cyclohexyl-2-benzothiazylsulphenamide (Vulkacit® CZ from LANXESS Deutschland GmbH)
14. Diphenylguanidine (Vulkacit® D/C from LANXESS Deutschland GmbH)
15. 1,6-Bis(N,N-dibenzylthiocarbamoyldithio)hexane (Vulcuren® from LANXESS Deutschland GmbH, CAS No.: 151900-44-6).

Testing of the Rubber Mixture and of the Vulcanizates:
Mooney Viscosity Measurement:

Viscosity can be directly determined from the opposing force exerted by rubbers (and rubber mixtures) during their processing. In the Mooney shearing-disc viscosimeter, a grooved disc is surrounded, above and below, by test substance, and is moved at a rate of about two revolutions per minute in a heatable chamber. The force required for this purpose is measured in the form of torque and corresponds to the respective viscosity. The specimen is generally preheated for one minute to 100° C.; the measurement takes a further 4 minutes, the temperature being held constant.

Viscosity is stated together with the respective test conditions, an example being ML (1+4) 100° C. (Mooney viscosity, large rotor, preheat time and test time in minutes, test temperature).

A Mooney shearing disc viscosimeter is used to measure the viscosities of the rubber mixtures mentioned in Table 1.

The same test can also be used to measure the "scorch" behaviour of a mixture. The selected temperature in this patent is 130° C. The rotor runs until the torque value has passed through a minimum and then has risen to 5 Mooney units relative to the minimum value (t5). The greater the value (unit here: seconds), the slower the scorch (high scorch values here).

Rheometer (Vulcameter) Full Vulcanization Time, 170° C./t95:

The progress of the vulcanization process in an MDR (moving die rheometer) and analytical data therefor are measured in accordance with ASTM D5289-95 in a Monsanto MDR 2000 rheometer. Table 2 collates the results of this test.

expressed as modulus (tensile strength for the stated 300% elongation, or 300 modulus).

Table 1 lists the test results.

Dyn. Damping:

Dynamic test methods are used to characterize the deformation behaviour of elastomers under loadings which alter periodically. An externally applied stress alters the conformation of the polymer chain.

This measurement determines the loss factor tan delta (indirectly by way of the relationship between loss modulus G" and storage modulus G').

The invention is explained in more detail by using the examples below, but there is no intention that these restrict the invention.

|  |  |  | Reference pts. by wt. | Example 1 pts. by wt. | Example 2 pts. by wt. |
|---|---|---|---|---|---|
| Batch No. |  |  |  |  |  |
| BUNA CB 24 | BR |  | 30 | 30 | 30 |
| BUNA VSL 5025-2 | SBR |  | 96 | 96 | 96 |
| CORAX N 339 | Carbon Black |  | 6.4 | 6.4 | 6.4 |
| VULKASIL S | Silica |  | 80 | 80 | 80 |
| TUDALEN 1849-1 | Processing additive |  | 8 | 8 | 8 |
| EDENOR C 18 98-100 | Processing additive |  | 1 | 1 | 1 |
| VULKANOX 4020/LG | Antioxidant |  | 1 | 1 | 1 |
| VULKANOX HS/LG | Antioxidant |  | 1 | 1 | 1 |
| ROTSIEGEL ZINC WHITE | Accelerator |  | 2.5 | 2.5 | 2.5 |
| ANTILUX 654 | Wax |  | 1.5 | 1.5 | 1.5 |
| SI 69 | Silane |  | 6.4 | 6.4 | 6.4 |
| VULKACIT D/C | Accelerator |  | 2 | 2 | 2 |
| VULKACIT CZ/C | Accelerator |  | 1.5 | 1.5 | 1.5 |
| 90/95 CHANCEL GROUND SULPHUR | Sulphur |  | 1.5 | 1.5 | 1.5 |
| VULCUREN | Anti-reversion agent |  |  | 1 | 0.5 |
| Mooney Viscosity (ML 1 + 4) | [ME] | DIN 53523 | 88 | 106 | 95 |
| Scorch time (MS-t5) | sec | by analogy with ASTM D5289-95 | 667.8 | 551 | 798 |
| Vulcanization time (t95% conversion time) | s | DIN 53529 | 1223 | 262 | 544 |
| Hardness | [Shore A] | DIN 53505 | 66 | 65 | 64 |
| 300 modulus | MPa | DIN 53504 | 15.7 | 19.5 | 15.3 |
| Elongation at break | % | DIN 53504 | 323 | 313 | 386 |
| Tensile strength | MPa | DIN 53504 | 17.3 | 20.5 | 22 |
| Abrasion | mm$^3$ | DIN 53516 | 84 | 78 | 79 |
| Dynamic properties/ Eplexor test* (Heating rate: 1 K/min) |  |  |  |  |  |
| tan d (0° C.) - index of wet skid resistance |  |  |  | 0.459 | 0.434 | 0.44 |
| tan d (60° C.) - index of rolling resistance |  |  |  | 0.132 | 0.112 | 0.132 |

The full vulcanization time is the time measured at which 95% of the rubber which has been crosslinked. The selected temperature was 170° C.

Analogous Determination of Hardness:

To determine the hardness of the rubber mixture according to the invention, milled sheets of thickness 6 mm made of the rubber mixture were produced in accordance with formulations of Table 1. Test specimens of diameter 35 mm were cut out from the milled sheets, and a digital Shore hardness tester (Zwick GmbH & Co. KG, Ulm) was used to determine the Shore A hardness values of these.

Tensile Test:

The tensile test serves for direct determination of the loading limits of an elastomer. Longitudinal elongation at break is related to the initial length to give the elongation at break. The force required to achieve certain degrees of elongation, mostly 50, 100, 200 and 300%, is also determined, and The anti-reversion agent Vulcuren was added in two dosages (0.5 phr and 1.0 phr—part per hundred rubber) to the first mixing stage for the rubber mixture. As the results show, the rise in Mooney viscosity is surprisingly only insignificant. The person skilled in the art is aware that rubber mixtures with Mooney viscosities up to 150 give very good results in processing. The two examples moreover show that, surprisingly, when relatively high amounts of Vulcuren are added the vulcanization time can be reduced considerably (by up to 80%; cost saving through less energy and/or productivity can be increased). The values measured for the mechanical properties, such as hardness (Shore A), 300 modulus, elongation at break, tensile strength, and also abrasion remain almost constant within the margin of error. Finally, it should be noted that the data measured for the dynamic properties, such as tan delta measured at 0 degree Celsius, are almost constant, but that the values for tan delta (measurement at 60° C.) decrease as the amount of Vulcuren added increases. This indicates that addition of the Vulcuren in the first mixing stage can achieve an improvement in rolling resistance.

What is claimed is:

1. A process for producing rubber mixtures in a mixing process with a plurality of mixing stages, which can optionally be divided into a plurality of sub-steps, the process comprising the mixing of the following components:
    one or more rubbers,
    one or more hydroxylated oxidic fillers,
    one or more sulphur-containing organosilicon and/or one or more hydroxy-containing polysulphide compounds,
    one or more anti-reversion agents selected from 1,6-bis(N,N-dibenzyl-thiocarbamoyldithio)hexane (CAS No.: 151900-44-6) and 1,3-bis((3-methyl-2,5-dioxopyrrol-1-yl)methyl)benzene (CAS No.: 119462-56-5) which are incorporated into the mixture in a first mixing stage,
    one or more vulcanization additives, and
    one or more rubber additives.

2. The process according to claim 1, wherein the anti-reversion agent is 1,6-bis(N,N-dibenzylthiocarbamoyldithio)hexane (CAS No.: 151900-44-6).

3. The process according to claim 2, wherein the one or more anti-reversion agent(s) is/are added in the first mixing stage in at least two sub-steps, optionally in at least two portions.

4. The process according to claim 3, wherein the amount of anti-reversion agent(s) used is from 0.1 to 20% by weight, based in each case on the amount of rubber used.

5. The process according to claim 3, wherein the mixing process takes place in at least two mixing stages.

6. The process according to claim 3, further comprising, in the first mixing stage, mixing takes place at a temperature of from 120° C. to 170° C.

7. The process according to claim 1 or 5, further comprising adding
    the one or more hydroxylated oxidic fillers,
    the one or more sulphur-containing organosilicon compounds and/or the one or more hydroxy-containing polysulphide compounds, and
    the one or more anti-reversion agent(s)
in at least two sub-steps in the first mixing stage, in at least two portions.

8. The process according to claim 1, further comprising adding, in the second mixing stage, rubber additives, and also vulcanization additives, at <140° C., where the rubber mixture is cooled between the first and second mixing stage.

9. The process according to claim 8, further comprising, between the first and the second mixing stage, subjecting the rubber mixture to a further remill step.

10. The process according to claim 3, wherein the amount of anti-reversion agent(s) used is from 0.2 to 10% by weight, based in each case on the amount of rubber used.

11. The process according to claim 3, wherein the amount of anti-reversion agent(s) used is from 0.3 to 3% by weight, based in each case on the amount of rubber used.

12. The process according to claim 1, further comprising adding, in the second mixing stage, rubber additives, and also vulcanization additives, at <100° C., where the rubber mixture is cooled between the first and second mixing stage.

* * * * *